C. A. ANDERSON.
REAR PACKAGE CARRIER FOR BICYCLES AND THE LIKE.
APPLICATION FILED OCT. 18, 1920.
1,417,223.
Patented May 23, 1922.
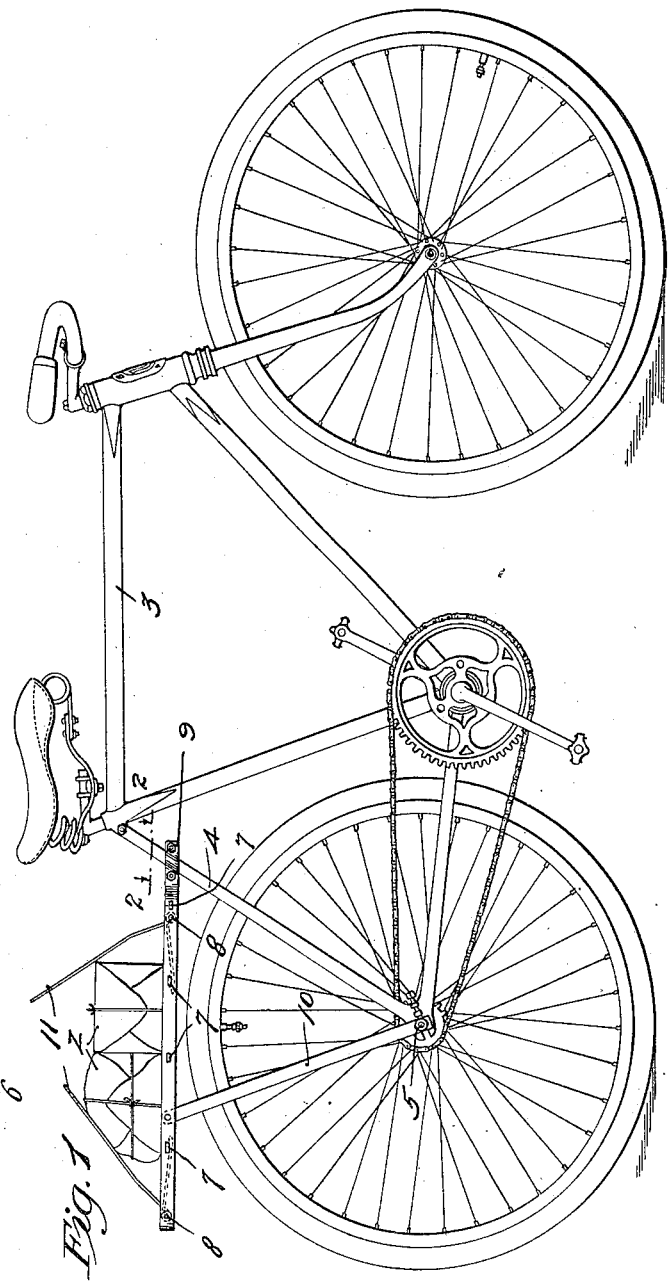
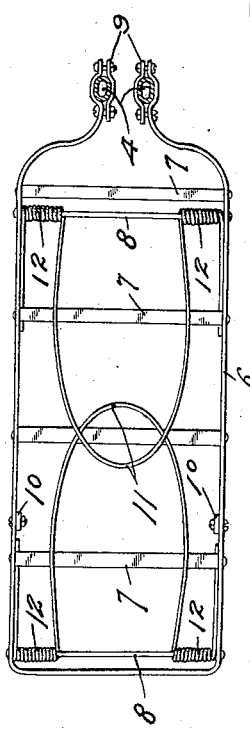
Inventor
Carl A. Anderson
By his Attorney
Harry D. Kilgore

UNITED STATES PATENT OFFICE.

CARL A. ANDERSON, OF MINNEAPOLIS, MINNESOTA.

REAR PACKAGE CARRIER FOR BICYCLES AND THE LIKE.

1,417,223.  Specification of Letters Patent.  Patented May 23, 1922.

Application filed October 18, 1920. Serial No. 417,702.

*To all whom it may concern:*

Be it known that I, CARL A. ANDERSON, a citizen of the United States, residing at Minneapolis, in the county of Hennepin and State of Minnesota, have invented certain new and useful Improvements in Rear Package Carriers for Bicycles and the like; and I do hereby declare the following to be a full, clear, and exact description of the invention, such as will enable others skilled in the art to which it appertains to make and use the same.

My present invention relates to package-carrying attachments for bicycles and the like and has for its object to provide such a carrier having wings that will clamp one or more packages onto the carrier and securely hold the same thereon and in case the packages should shift their positions, under the jarring action of the bicycle, said wings will automatically follow said packages.

The improved package-carrying attachment is especially adapted to be secured to the frame of the bicycle at the rear of the seat thereof.

To the above end, generally stated, the invention consists of the novel devices and combinations of devices hereinafter described and defined in the claims.

Referring to the drawings:

Fig. 1 is a side elevation of a bicycle having the package-carrying attachment applied thereto; and Fig. 2 is an enlarged plan view of the package-carrying atttachment with a portion of the bicycle frame sectioned on the line 2—2 of Fig. 1.

The numeral 3 indicates a bicycle, as an entirety, with the exception of the upright members of the rear fork 4 and rear spindle 5.

The invention includes a base or basket having a rectangular marginal frame 6, the sides of which are rigidly connected by a plurality of forwardly and rearwardly spaced tie bars 7 and front and rear tie rods 8. The frame 6, as shown, is formed from a single piece of metal, the ends of which are extended forward in parallel arrangement, at the front of said frame, and provided with two-part clamps 9 held together by nut equipped bolts and adapted to be secured to the upright members of the rear frame fork 4, as best shown in Fig. 2, and support the front end of the package-carrying attachment. To support the rear end of the package-carrying attachment, there is pivoted to the sides of the base, a pair of legs 10, the lower ends of which are secured to the spindle 5.

A pair of co-operating U-shaped clamping wings 11 is provided for holding packages Z on the base. The ends of the wings 11 are coiled around the tie rods 8 to afford combined hinges and springs 12 to connect said wings to the base. The tie ends of the combined hinges and springs 12 are anchored under certain of the tie bars 7 and under strain, to move the wings 11 inwardly and downwardly. Normally, the wings 11 are held folded by their combined hinges and springs 12 in overlapped arrangement upon certain of the bars 7. In placing the packages Z on the base or basket, the wings 11 are lifted upwardly and outwardly against the tension of the combined hinges and springs 12 and the packages placed on certain of the bars 7 between the clamping wings 11. The wings 11 are then released and yieldingly press the packages Z together and onto the bars 7. It will be noted that the marginal frame 6 extends above the bars 7 and acts as a retaining flange which assists in holding the packages. The wings 11 will hold securely, one or more packages of various sizes and shapes on the carrying attachment. When the package-carrying attachment is not in use, the wings 11 rest upon the bars 7 and are entirely out of the way.

In case the articles on the carrying attachment work closer together in more compact form or shift their position thereon, the wings will automatically follow the same and securely hold the same.

The term "packages" is herein used in a broad sense, to cover parcels, books and the like.

The extended ends of the marginal frame 6 may be easily sprung together or apart to adjust the clamps 9 to arch bars spaced at different distances apart.

The above described invention, while extremely simple and of small cost to manufacture, can be very quickly applied to a bicycle or removed therefrom.

What I claim is:

1. A package carrier comprising a supporting member adapted for attachment to a vehicle of the bicycle or motorcycle type, a clamping wing pivotally mounted near one end of the member, a second clamping wing pivotally mounted near the other end of said member, resilient means exerting its influence to press each of said wings downwardly upon said member, whereby articles resting upon said carrier may be pushed horizontally thereof and resiliently held upon said supporting member, substantially as described.

2. A package carrier comprising a supporting member adapted for attachment to a vehicle of the bicycle or motorcycle type, a wing pivoted adjacent each end of the member and resiliently pressed towards the bottom of the latter, and towards articles resting upon said member, whereby said articles may be held thereupon and pushed against each other, and means on the member for preventing lateral movement of said articles, said wings being adapted to lie in overlapping relation when in inoperative position, substantially as described.

In testimony whereof I affix my signature.

CARL A. ANDERSON.